(12) United States Patent
Kajekar et al.

(10) Patent No.: US 7,971,244 B1
(45) Date of Patent: Jun. 28, 2011

(54) METHOD OF DETERMINING NETWORK PENETRATION

(75) Inventors: Preetham Kajekar, Bangalore (IN);
Sandeep R. Hebbani, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 2102 days.

(21) Appl. No.: 10/718,175

(22) Filed: Nov. 19, 2003

(51) Int. Cl.
*G06F 11/00* (2006.01)
*G06F 7/04* (2006.01)
*G06F 15/173* (2006.01)

(52) U.S. Cl. .............. 726/22; 726/2; 726/25; 709/224
(58) Field of Classification Search .................. 709/224; 726/2, 22, 25, 27–29
See application file for complete search history.

(56) References Cited

U.S. PATENT DOCUMENTS

| | | | |
|---|---|---|---|
| 5,485,409 A * | 1/1996 | Gupta et al. ................. 726/25 |
| 5,909,550 A | 6/1999 | Shankar et al. | |
| 6,115,751 A | 9/2000 | Tam et al. | |
| 6,131,117 A | 10/2000 | Clark et al. | |
| 6,222,822 B1 | 4/2001 | Gerardin et al. | |
| 6,381,221 B1 | 4/2002 | Legouet-Camus et al. | |
| 6,425,009 B1 | 7/2002 | Parrish et al. | |
| 6,473,406 B1 | 10/2002 | Coile et al. | |
| 6,477,174 B1 | 11/2002 | Dooley et al. | |
| 6,499,107 B1 | 12/2002 | Gleichauf et al. | |
| 6,505,244 B1 | 1/2003 | Natarajan et al. | |
| 6,539,427 B1 | 3/2003 | Natarajan et al. | |
| 6,577,597 B1 | 6/2003 | Natarajan et al. | |
| 6,584,502 B1 | 6/2003 | Natarajan et al. | |
| 6,704,866 B1 | 3/2004 | Benayoun et al. | |
| 7,013,395 B1 * | 3/2006 | Swiler et al. ................. 726/25 |
| 7,200,105 B1 * | 4/2007 | Milliken et al. .............. 370/216 |
| 7,293,287 B2 * | 11/2007 | Fischman et al. ............ 726/22 |
| 2003/0202531 A1 | 10/2003 | Dooley et al. | |
| 2003/0233444 A1 | 12/2003 | Bakita et al. | |
| 2005/0055573 A1 * | 3/2005 | Smith ......................... 713/201 |
| 2005/0138413 A1 * | 6/2005 | Lippmann et al. ............ 713/201 |
| 2005/0193430 A1 * | 9/2005 | Cohen et al. ................. 726/25 |

OTHER PUBLICATIONS

Cisco Systems, Inc., "NetFlow Services for an Enterprise Network," Incorporated final editorial comments Mar. 29, 2002, pp. 1-52.
Cisco Systems, Inc., "Network Management Basics," 1992-2002, http://www.cisco.com/univercd/cc/td/doc/cisintwk/ito_doc/nmbasics.htm, data retrieved on Mar. 11, 2004, pp. 1-5.
Cisco Systems, Inc., "White Paper: Monitoring Cisco Unity Performance (Version 3.x)," Jan. 16, 2002, pp. 1-20.
Cisco Systems, Inc., "Cisco Network Monitoring and Event Correlation Guidelines," Reference Guide, 1999, pp. 1-77.
Cisco Systems, Inc., "Monitoring the Network with SNMP," Chapter 9, Catalyst 3000 and Catalyst Stack User Guide, 1989-1997, pp. 9-1-9-8.
Cisco Systems, Inc., "Monitoring the Network with SNMP," 1989-1997, http://www.cisco.com/univercd/cc/ki/doc/product/lan/cat3ks/c3ksug/cat3ks09.htm, data retrieved on Mar. 11, 2004, pp. 1-5.

(Continued)

*Primary Examiner* — Philip J Chea
(74) *Attorney, Agent, or Firm* — Hickman Palermo Truong & Becker LLP

(57) ABSTRACT

A method of determining network penetration (which may be carried on a computer readable medium) and an apparatus for performing the method are disclosed. The method includes the computer-implemented step of simulating a packet traveling in a network based on topology data and on security policy data, and providing output related to results of the step of simulating.

67 Claims, 7 Drawing Sheets

OTHER PUBLICATIONS

Cisco Systems, Inc., "Network Monitoring Using Cisco Service Assurance Agent," Cisco IOS Configuration Fundamentals Configuration Guide, Release 12.1, May 2002, pp. FC-281-FC302.

Cisco Systems, Inc., "Cisco Intrusion Detection System Signature Engines Version 3.0," Jul. 2001, 78-13346-01, pp. 1-32.

Cisco Systems, Inc., "Monitoring Network Faults," Chapter 5, Cisco WAN Manager's User's Guide, Release 12, Part No. OL-3838-01 Rev. D0, Jan. 2004, 1992-2004, pp. 5-1-5-60.

Cisco Systems, Inc., "Monitoring Network Traffic Using SPAN," Chapter 24, Cisco MDS 9000 Family Configuration Guide, 78-15801-01, Cisco MDS SAN-OS Release 1.2(1a), 1992-2004, pp. 24-1-24-28.

Cisco Systems, Inc., "Monitoring Your Network Topology," Chapter 12, Cisco ONS 15530 Configuration Guide and Command Reference, 78-14227-03, Cisco IOS Release 12.1(12c)EV1, 1992-2002, pp. 12-1-12-26.

Cisco Systems, Inc., "Remote Monitoring," Chapter 55, Internetworking Technologies Handbook, 1-58705-001-3, 1992-2002, pp. 55-1-55-4.

Cisco Systems, Inc., "Monitoring Network Traffic," Chapter 11, 1992-2002, pp. 11-1-11-10.

Cisco Systems, Inc., "Monitoring Network Traffic," Chapter 11, 1992-2002, pp. 11-1-11-12.

* cited by examiner

METHOD OF DETERMINING NETWORK PENETRATION

FIELD OF THE INVENTION

The present invention generally relates to network systems. The invention relates more specifically to network security.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network security refers to limiting access to a portion of a network to those that are entitled to have access. Computer networks have grown from a collection of linked computers to a platform for conducting business. Consequently, there is a need for securing a network from unauthorized users or hackers. Security is a pre-requisite for most, if not all computer networks. Corporate networks are configured in accordance with a security policy that changes rapidly to meet new business requirements. Changes to security policy typically require a reconfiguration of various devices in the network.

One past approach to providing network security involves the use of Access Control Lists (ACLs), which list the users or types of users that are entitled to access an associated portion of the network. ACLs are used for packet filtering on routers, and ACLs help implement the overall security policy. Most network security policies are an aggregation of the configuration of ACLs. A network security policy could be constructed by configuring ACLs on various interfaces of routers forming the network.

However, ACL based network security has many disadvantages. As a result of the dynamic nature of the network requirements, ACLs on routers often need to be reconfigured to suit new needs. Whether ACLs are used for allowing a new business partner to access certain parts of the network, adding a remote location to the network, or ensuring hackers are misled to Jail systems to track/log their activities, typically ACLs present on different routers in different parts of a corporate network are required to be reconfigured. A network administrator needs to have a good understanding of ACLs, their requirements, and the network to reconfigure the network elements related to security.

The security policies of the network, although very comprehensive and understandable on paper, become complicated and difficult to implement when they take the form of ACLs that are being updated or modified frequently and spread across the devices of the network. The ACLs complicate the network security administration and hence create a very error-prone platform for security administration. Changes to security policy may require reconfiguration of Access Control Entries (ACEs) present in ACLs spread across many routers. A misconfiguration could result in many problems such as a compromised network (which could be hard to detect) and data-outages.

Based on the foregoing, the inventors hereof have recognized a need for aids for configuring ACLs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
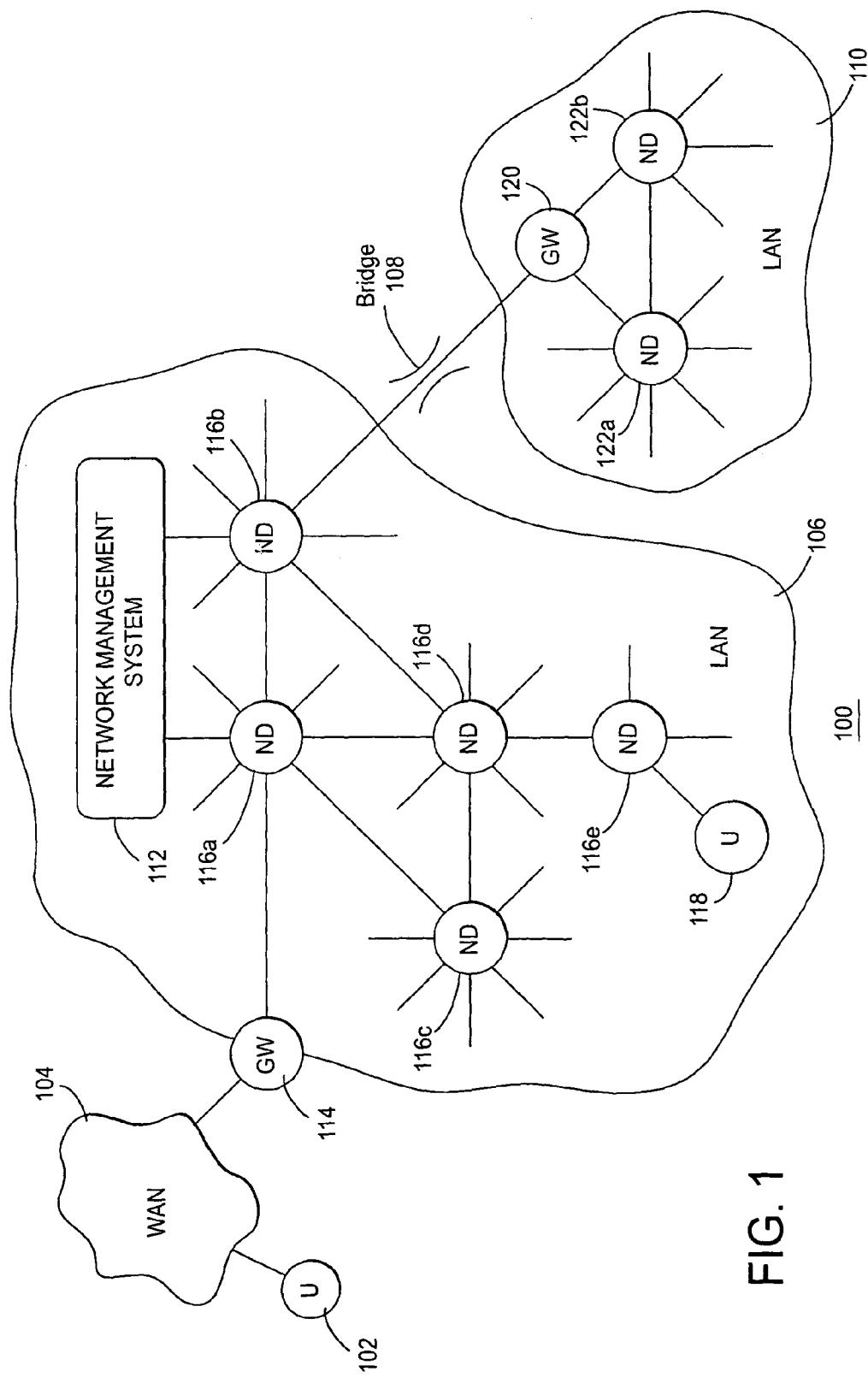
FIG. 1 shows a network having a local area network according to an embodiment of the invention.

A method and apparatus for determining network penetration is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Determining Network Penetration
   3.1 A Network
   3.2 A Network Management System for Viewing Penetration
   3.3 Input Fields
   3.4 Output Penetration Information
   3.5 A Network Device
   3.6 Process for Determining Penetration
4.0 Implementation Mechanisms—Hardware Overview
5.0 Extensions and Alternatives In general in this specification, for each of FIGS. 1-5, first a brief description of each numbered feature of the figure is given. In the brief description of each numbered feature, the name of each numbered feature is given. After the brief description of each numbered feature, a more detailed description of each numbered feature, and a description of how each of the features cooperate together, are provided. Each of the figures and features are generally discussed in the order in which they are numbered. Although headings are provided, information related to a particular heading, but not found in the section having that heading, may also be found elsewhere in the specification.

1.0 GENERAL OVERVIEW

The needs identified in the foregoing Background, and other needs and objects that will become apparent in the following description, are achieved in the present invention, which comprises, in one aspect, a method for determining penetration into a network. Certain embodiments provide features that can be used independently of one another or with any combination of the other features. Although many features are motivated by the problems explained above, the embodiments need not address any or all of the problems discussed above.

A method of determining network penetration, a computer readable medium that may carry instructions for performing the method, and an apparatus for performing the method are disclosed. In one embodiment, the method includes the computer-implemented steps of representing a travel of a packet in a network based on topology data and on security policy data, and providing output that may specify a penetration of the packet in the network that is related to results of the step of representing.

2.0 STRUCTURAL AND FUNCTIONAL OVERVIEW

Embodiments are disclosed that provide methods to aid network administrators in analyzing an ACL configuration across devices and hence analyze the overall behavior of the network based on user-specified packet parameters. Topology data and ACL data is correlated across devices to determine the penetration or reachability of a packet entering the network from a particular interface. Using the ACLs across devices that constitute the network and correlating them with the topology information that specifies device neighbors, the level of penetration of a packet-flow can be determined. A packet-flow can be categorized by its source network address, destination address, protocol, and entry port (or a range of sources or entry ports) and a destination port. Optionally, a source port (a designation of the type of interface to use, such as HTTP or FTP) may also be specified. The packet-flow pattern can be characterized by the particular interfaces on particular routers that the packets enter and exit. In other words, given a source IP address or a range of source IP addresses, and an entry point of the first hop router of that address, the extent of possible penetration of a packet into a network can be determined, based on the network topology and the ACL configurations on the devices. The correlated topology and ACL data can also be used to reveal which network resources are reachable via a given IP address, and thereby gives a picture of the potential loop-holes in the network security.

The correlated topology and ACL data may be used to provide a graphical or other representation of the network. In this specification, the words "represent," "representing," and "representation" are intended to be generic to simulate, simulating and simulation, respectively, which is generic in a computer model of the network (e.g., as determined by the ACL and topology data). The representation of the network may include a graphical or other representation of the ACL configurations by indicating along which network connections packets are allowed to travel from one network device to another network device. Using the representation of the ACL configurations, an administrator can determine the parts of the network that can be reached based on the entry point. A representation of the ACL configurations can help network administrators make a security analysis, troubleshoot a data-outage issue, and predict the level of network penetration that a user is capable of from a given entry port.

The correlated ACL and topology data may also be used to represent (e.g., simulate) the dynamic nature of the ACLs. In an embodiment, before performing the penetration testing, the user may specify the current state of the network. For example, the user may specify that host A has established a connection with a remote host B, which has added a dynamic entry in an ACL. Based on the current state, dynamic ACLs are updated and then used for penetration testing.

A graphical representation of the correlated ACL and topology data may be provided. A User Interface (UI) for displaying a graphical or other representation of the topology, the ACL configurations, and/or the static router configuration can help network administrators analyze how the various devices are configured.

The manner by which the penetration is determined is as follows, according to one embodiment. First, a packet flow is defined in terms of a source network address, such as a source IP address and source port. The flow may be further defined in terms of a destination IP address, destination port, and protocol. An entry point into the network for the packet-flow is specified, such as the IP address of a first-hop router, and a port or interface at which the specified packet arrives. In other words, a user or a program may specify a flow in terms of at least a source IP address and entry port, and optionally specify a 5-tuple including source network address, destination address, protocol, an entry port (or a range of entry ports), and a destination port. Optionally the source port may also be specified. A router and interface of that router at which the flow first arrives may also need to be specified to specify the flow. In one embodiment, the entry point is specified as an IP address for a first-hop router at which the flow first arrives, and a port or interface of the router at which the flow arrives. Optionally, a destination port may also be specified. The source network address and entry point may be specified by a user entering values in an appropriate UT. Alternatively, a management application or other first process may create a request that includes the source network address and entry point, and provide the request to a second process that implements the penetration analysis method described herein.

Next, the specified packet flow is checked against the inbound ACL of the specified network device interface. Then, if the ingress is permitted, the outbound ACLs are checked on each of the outbound interfaces of the router to determine the possible outbound interfaces on which the egress of a packet of the flow would be permitted. For each of the outbound interfaces of this network device for which egress is permitted, a neighbor device is determined. Then the above checks are performed recursively on each of the adjacent devices that is connected to the first device through the then-current inbound interface, and for all interfaces on the adjacent devices for which egress is permitted as indicated by the ACLs on such adjacent devices. The neighbor network device, to which a particular interface of the current network device is connected, is obtained from the topology information based on, for example, the network management system. The network devices reached via the recursive check represent all possible paths of the packet with the specified packet information. Optionally, a description of the network devices that were reached, and the possible paths taken by the specified packet, are presented to the user or returned to a calling process.

Alternatively, rather than specifying information corresponding to a single packet, a range of packets or flows can be specified as any combination of a range or set of source-addresses, destination-addresses, source ports, and/or destination ports. For example, the user could specify a range of packets using wild-card masks. The above algorithm could then be repeated for each packet and the combined results presented to the user.

Alternatively, ACLs can be examined to determine whether the ACLs permit or deny, on an ingress or egress interface, part or all of the range of packets the user specifies. After each hop to another network device, ACLs applicable only to the subset of the packets that are permitted need to be processed to determine how much further and to where the packets penetrate.

The above algorithm can be modified to use the information that is present in the static routing tables of each network device. Thus, in an alternative embodiment, a step of the algorithm looks up the static routes (if there are any at the current network device) to determine on which interface a packet would be sent, and then check the ACLs of just that interface. In an embodiment, if the packet does not match a static route, the algorithm presumes that the packet is capable of exiting through any interface. Consequently, all connected interfaces are checked to determine where else the packet may travel (if anywhere). In an embodiment other packet parameters as well may be processed, such as Transmission Control Protocol (TCP) flags, which are set to determine where the packet is allowed to travel.

Information defining potential network penetration, and the possible paths that a packet flow or range of packets can take, may be used as baseline data with which the security of the network can be analyzed, a particular security setup can be validated, the consequences of the presence and/or the absence of a particular security policy can be tested, or the ACLs that triggered data outage issues can be evaluated, for example. In an embodiment, to aid in configuring the ACLs, the correlated topology and ACL data may be used for verifying and/or re-verifying the security of the network against every newly conceived vulnerability with the same base of ACLs. In an embodiment, to aid in configuring the ACLs the correlated topology and ACL data may be used to check the correctness of an ACL configuration when making ACL configuration changes on devices. Management applications or network administrators may use the baseline data for such purposes. The methods described in this specification may be used in addition to or instead of actually sending a packet through a network and detecting which network devices the packet visits before reaching its destination.

3.0 DETERMINING NETWORK PENETRATION

3.1 A Network

FIG. 1 shows network 100. Network 100 includes user 102, Wide Area Network (WAN) 104, Local Area Network (LAN) 106, bridge 108, and local area network 110. Local area network 106 includes network management system 112, gateway 114, network devices 116 A-E and user 118. Local area network 110 includes gateway 120 and network devices 122 A and B. Network 100 is intended as a general example of many contexts in which embodiments may be implemented. In other embodiments, network 100 may not have all of the components listed above. Also, network 100 may have other components in addition to and/or instead of those listed above.

Network 100 is a network that includes features that facilitate validating the security policy. Users 102 and 118 could be connected to their respective networks WAN 104 and LAN 106 by a personal computer, laptop, palm pilot, terminal, or any other network appliance. WAN 104 could be the Internet and/or any other wide area network. LAN 106 and LAN 110 could be any local configuration of computers, such as that of a company or an organization. Bridge 108 connects LAN 106 to LAN 110. Gateway 114 determines what messages are able to enter LAN 106. Network devices 116A, 116B, 116C, 116D, and 116E could be routers, switches, or servers, for example, and although they may have other functions they also function to route packets through the network through LAN 106.

Network management system 112 manages LAN 106. Additionally, network management system 112 includes features that facilitate validating the security policy reflected in the configurations of network devices 116A, 116B, 116C, 116D, and 116E. Specifically network management system 112 is capable of correlating network topology and ACL data to determine allowable paths through LAN 106 that a packet can take. An example of network management system 112 is discussed in conjunction with FIG. 2, below. Gateway 120 determines what packets or messages are able to enter into local area network 110.

When user 102 sends messages to user 118, packets carrying the message travel through WAN 104, gateway 114, and one or more of network devices 116A-E to arrive user 118. Different packets may travel along different routes that traverse different ones of network devices 116A-E. Network devices 116A-E, 122A and 122B include ACLs for limiting access of users to those portions they are entitled to access. An example of a network device is discussed in FIG. 5.

3.2 Network Management System for Viewing Penetration

Figure 2:
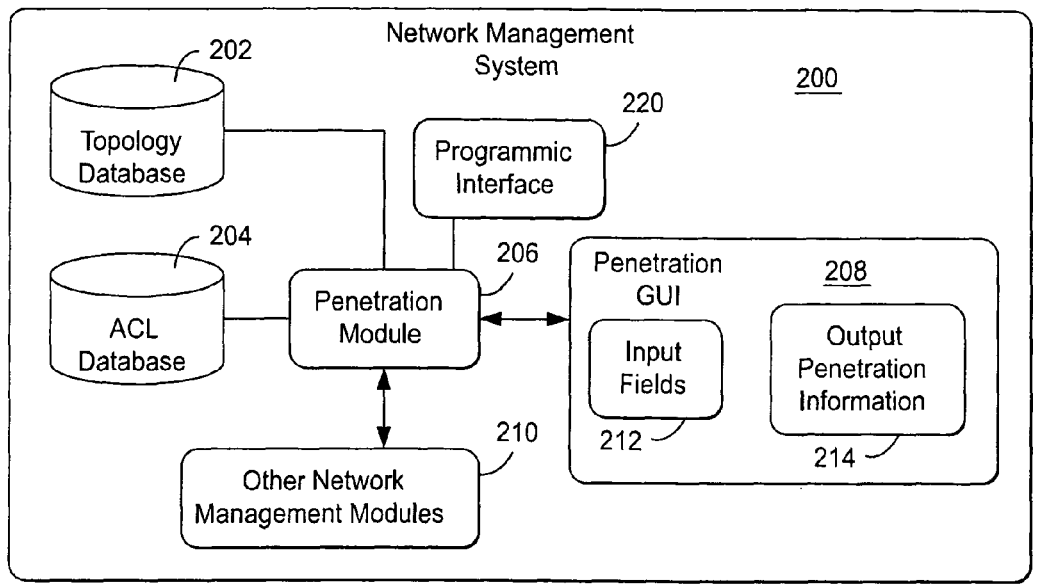
FIG. 2 shows an example of a network management system that can be used in the network of FIG. 1.

FIG. 2 shows network management system 200, which includes topology database 202, ACL database 204, penetration module 206, penetration Graphical User Interface (GUI) 208, and other network management modules 210. Penetration GUI 208 includes input fields 212 and output penetration information 214. Network management system 200 may also include programming interface 220. In other embodiments, network management system 200 may not have all of the components listed above. Also, network management system 200 may have other components in addition to and/or instead of those listed above.

Network management system 200 is an example of network management system 112. Topology database 202 includes topology of LAN 106 including, for example, information about which routers, servers, and other computers are connected to one another. ACL database 204 includes information listing the location of ACLs that are placed throughout LAN 106 and may also include the contents of those ACLs.

Penetration module 206 is used to determine the penetration of a packet flow. Penetration module provides a correlation of ACL data and network topology. In an embodiment, given information identifying a packet or packet flow, an entry point or range of entry points to network 106, and a destination or range of destinations, penetration module 206 creates a graphical or other representation of the possible paths that a packet may take (the representation may be referred to as a "mapping" or a "map," and the possible paths that a packet may take may be referred to as the "possible travel" of a packet). Penetration module 206 may also use other packet parameters or network data in mapping the possible paths of a packet.

Figure 6A:
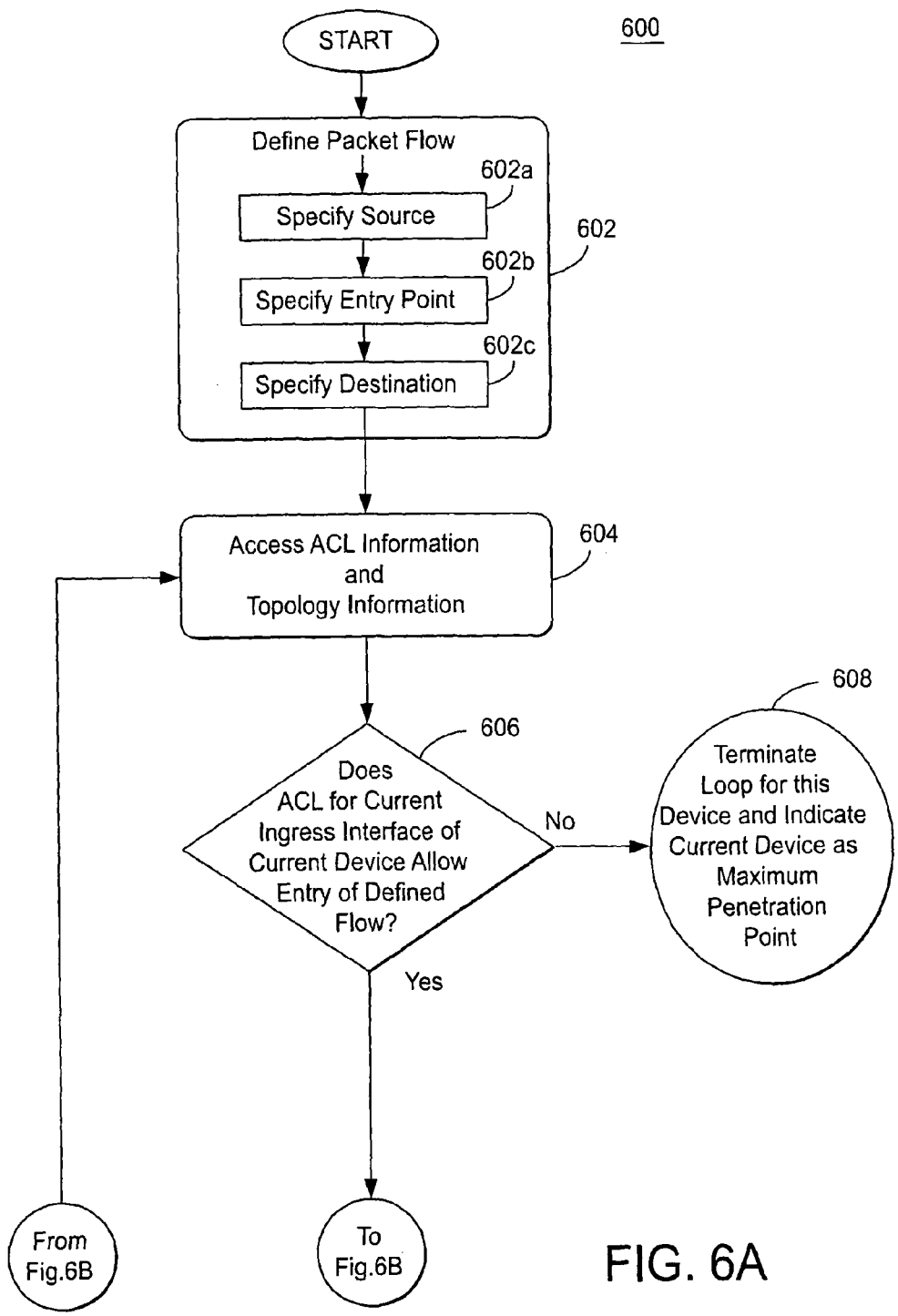
FIG. 6A and FIG. 6B are flow diagrams that show a method for determining network penetration.
Figure 6B:
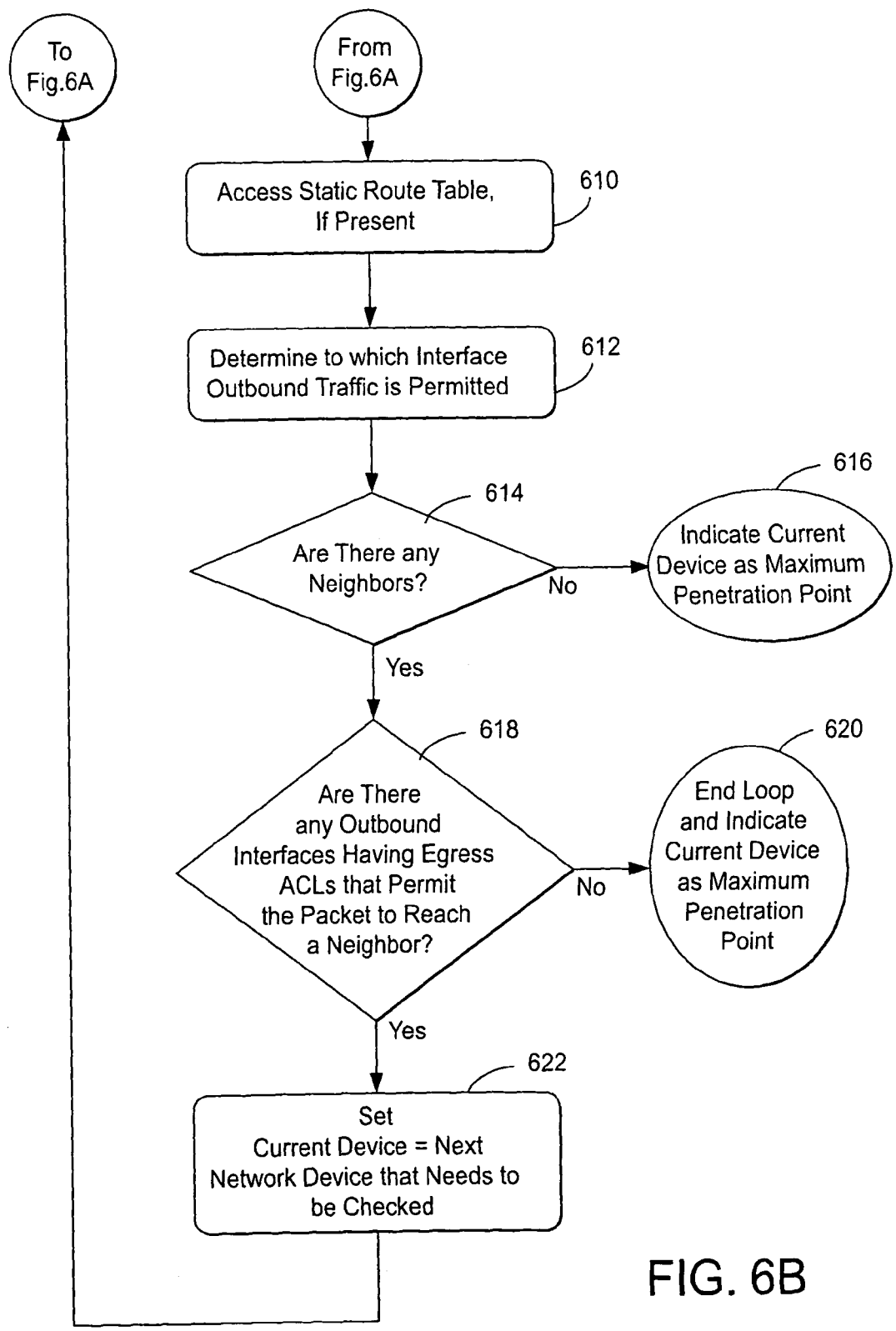

In an embodiment, the mapping is formed by starting from a specified first network device, and then investigating the ACLs associated with that network device, and following all paths allowed by the ACLs to the next network device along each path, based on comparing the ACLs to information defining a packet, a packet flow, or range of packets. Then the process is repeated recursively for each network device for which it is determined that a packet can reach. Mapping the possible paths may be used in addition to or instead of actually sending packets through network 106 and detecting which network devices the packet visits before reaching its destination. Method 600, discussed below in conjunction with FIGS. 6A and 6B, is an example of a mapping process (a process of creating the map or representing a travel of a packet), which may be implemented by penetration module 206.

Penetration GUI 208 is used by a network manager to interface with penetration module 206. Using penetration GUI 208, a user can input ACL data, topology information and packet data in order to view the penetration and correlation information computed by penetration module 206. Other management module 210 contains one or more modules for performing other network management functions. In an embodiment, penetration module 206 and/or any of the other components of network management system 200 may be located in a module that is separate from network management system 200 and other management module 210.

In penetration GUI 208, input fields 212 may include a variety of packet parameters, topology information and ACL information. Input fields 212 are discussed further in conjunction with FIG. 3, below. Output penetration information 214 may include penetration information and correlation information corresponding to the parameter values in input field 212. Output penetration information 214 is discussed further in conjunction with FIG. 4.

In addition to penetration GUI 208, or as an alternative to penetration GUI 208, network management system 200 may comprise a programmatic interface 220 that enables a network management application, module, or external application to submit requests to and receive results from penetration module 206. For example, programmatic interface 220 may comprise an application programming interface (API) to penetration module 206 that enables an application to submit a request for a penetration analysis to the penetration module, in which the request specifies a packet flow and an entry point interface, for example. The API may also define result messages that are passed from the penetration module 206 back to the requesting application. For example, the result messages may provide a list of network devices that the specified packet can reach, identified by device name, network address, IP address, and/or other unique identifier.

3.3 Input Fields

Figure 3:
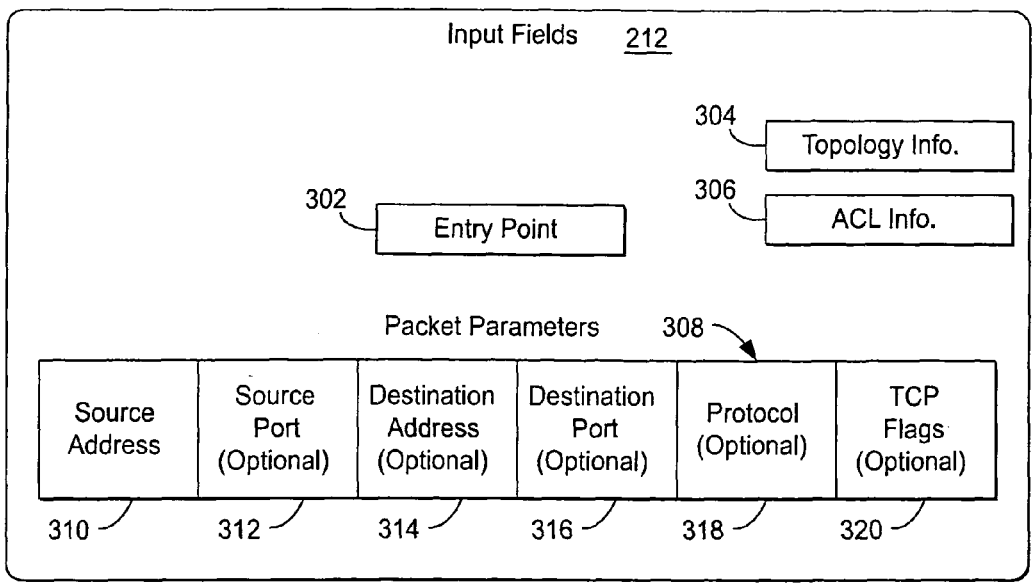
FIG. 3 shows an example of input fields associated with a penetration module of the network management system of FIG. 2.

FIG. 3 shows input fields 212, including entry point 302, topology information 304, ACL information 304, ACL information 306, source address 310, and packet parameter 308, which may include source address 310, source port 312 (which is optional), destination address 314, destination port 316 (which is optional), protocol 318 (which is optional), and TCP flags 320 (which are also optional). In other embodiments, input fields 312 may not have all of the components listed above. Also, input fields 312 may have other components in addition to and/or instead of those listed above.

Entry point 302 is for entering the entry point, such as by specifying the address of a first hop router. There may be multiple entry points 302 including a separate set of entries for each group of packets. Each entry point 302 may be capable of accepting multiple entries and/or wild card entries to facilitate describing groups of packets having different entry points 302.

Topology information 304 can be used for entering topology information and may also display topology information of the current network. ACL information 306 may be used to describe current ACL information. ACL information 306 may be the name of a file or a list of files containing the ACL information or containing pointers to where the ACL information can be found. Alternatively, ACL information 306 may display to the user all of or any portion of the actual ACL information. ACL information 306 may also be usable for entering ACL information of a new or proposed network.

Packet parameters 308 can be used for entering the parameters of packets of the packet flow of interest for which the penetration will be determined. Source address 310 is the address of the device that is the source of the packet. Source port 312 is a designation of the type of interface to use, such as HTTP or FTP. Destination address 314 is the address to which the packet is being sent. Destination port 316 could be the port through which the packet leaves LAN 106. Protocol 318 lists any protocols that are associated with the packet. TCP flags 320 lists any TCP flags associated with the packet. In an embodiment, entry point 302 may be included within packet parameters 308. There may be multiple packet parameters 308 including a separate packet parameters 308 for each packet and/or for each group of packets. Each of the fields of any of the packet parameters 308 may be capable of accepting multiple entries and/or wild card entries to facilitate describing groups of packets having different entry points 302 and/or exit points.

3.4 GUI Output Penetration Information

Figure 4:
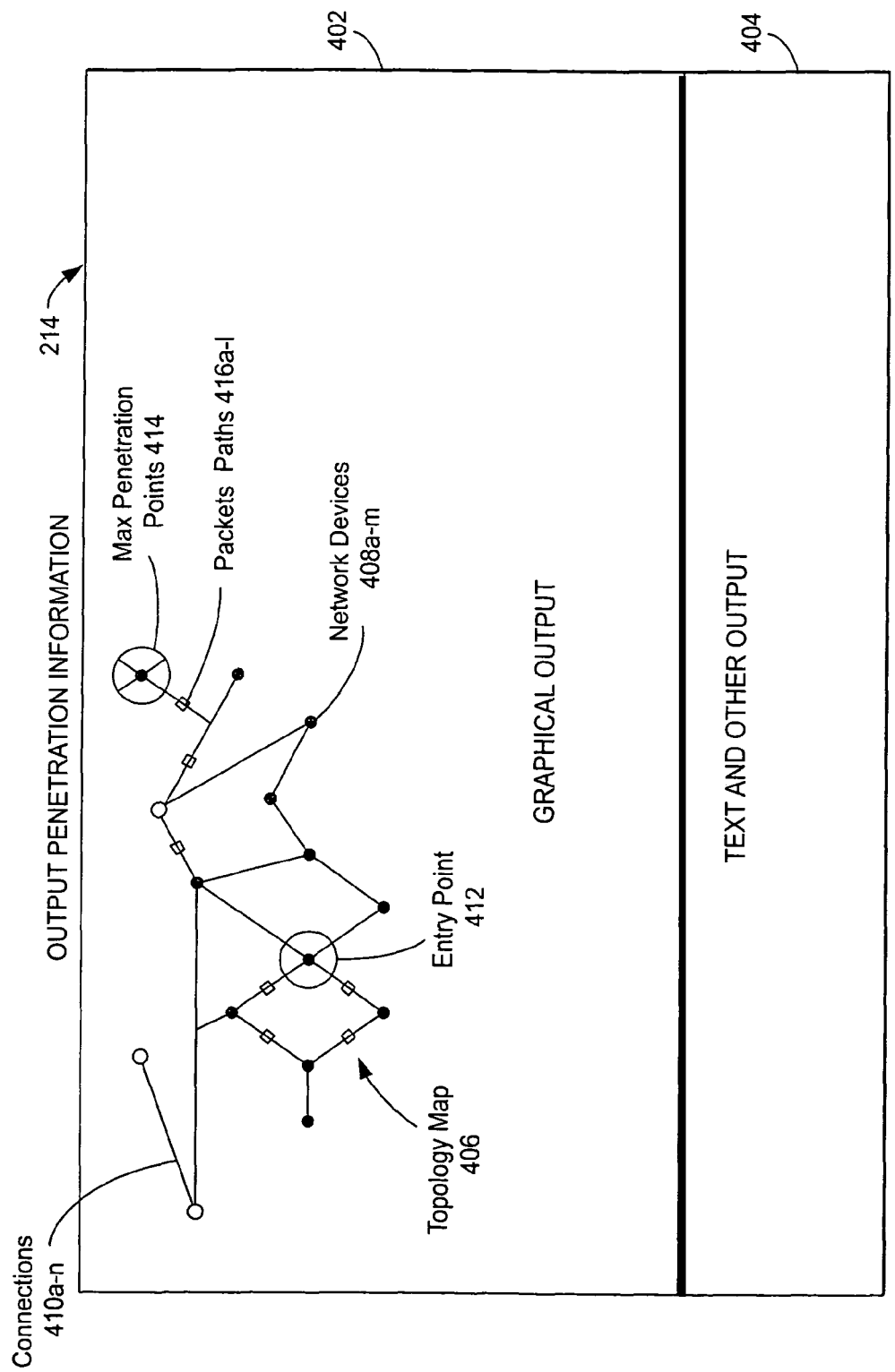
FIG. 4 shows an example of GUI output penetration information associated with the penetration module of FIG. 2.

FIG. 4 shows GUI output penetration information 214, which includes graphical output 402 and text and other output 404. Graphical output 402 includes topology map 406, which includes network devices 408 a-m that are connected by connections 410 a-n, entry point 412, maximum penetration point 414, and packet paths 416 a-l. In other embodiments, GUI output penetration information 214 may not have all of the components listed above. Also, GUI output penetration information 214 may have other components in addition to and/or instead of those listed above.

Topology map 406 displays topology of the network being modeled, which may be the topology of LAN 106. The network devices 408 a-m may be the network devices of LAN 106. The connections 410 a-n, represented by lines, are the connections of LAN 106 as limited by the ACLs of network devices 408a-m. Connections 410 a-n are the connections connecting network devices 408a-m. Entry point 412 is the point at which the packet enters LAN 106, and is described by packet parameters 308 and entry point 302. Maximum penetration 114 is a point furthest from the entry point that the packet described by packet parameters 308 will travel. Maximum penetration point 114, may be identified according to whether a packet that enters a particular network device is allowed to exit that network device. In an embodiment, a network device is indicated as the maximum penetration point if and only if there are some egress ACLs that inhibit, or a static route that inhibits, packets from exiting via some interfaces of the current network device, because the current network device is the maximum penetration point in the directions of travel that the egress is blocked. Packet paths 416a-l are represented by those of connections 410a-n having a box on the line representing the connection. Packet paths 410a-l are the possible paths along which the packet of packet parameters 308 may travel. Although only one entry point and maximum penetration point are shown in FIG. 4, there may be more than one entry point and maximum penetration point depicted on topology map 406. In alternative embodiments, source address 310 may also be illustrated on topology map 406 in addition to or instead of entry point 302. In alternative embodiments, destination port 316 and/or destination address 318 may also be illustrated on topology map 406.

3.5 Network Device

Figure 5:
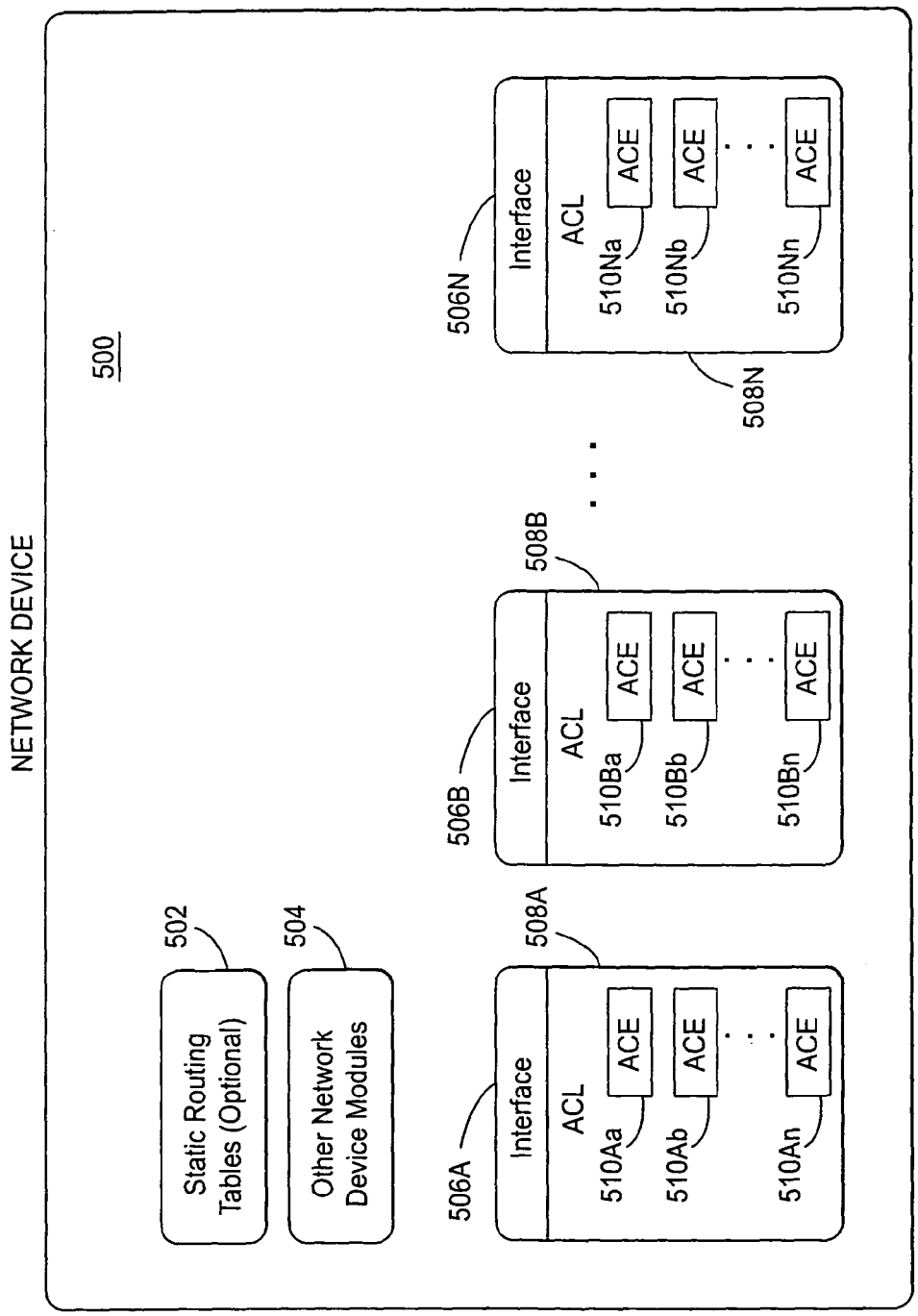
FIG. 5 shows an example of a network device of the network of FIG. 1.

FIG. 5 shows a network device 500, according to one embodiment. Network device 500 includes static routing tables 502, other network modules 504, and interfaces 506A-N. Interfaces 506A-N are the interfaces for the input and output ports of network device 500. Interfaces 506A-N include ACLs 508A-N, which include Access Control Entries (ACEs) 510 Aa-Nn. In other embodiments, network device 500 may not have all of the components listed above. Also, network device 500 may have other components in addition to and/or instead of those listed above.

Static routing tables 502 contain tables of statically defined routes. In this context, each static route specifies, for a packet that enters at one interface, which one or more other interfaces the packet is allowed to leave. Typically, the packet is allowed to egress through only one specified interface if a static routing table is present. In an embodiment, ACLs have a higher precedence over static routing tables 502. Thus, the packet will not be able to egress through the interface specified by static routing tables 502, if the ACLs do not allow the egress. The use of static routing tables 502 is not required in an embodiment.

Other network device modules 504 comprise one or more modules for performing other functions of the kind that are conventional for a network device. ACLs 508A-N are the ACLs for each of interfaces 506A-N, respectively, each of which lists interfaces on which an exiting packet is allowed to exit to if entering from the associated interface. ACEs 510 Aa-Nn comprise access control entries that list the ports through which egresses are allowed by ACLs 508 A-N. In an embodiment, the restrictions on egress imposed by ACLs 508A-N and ACEs 510 Aa-Nn take precedence over the routes specified by static routing tables 502.

3.6 Penetration Algorithm

FIG. 6A and FIG. 6B are flow diagrams that show a method 600 for determining network penetration of a packet flow.

In step 602 the packet flow is defined, which may include substeps 602a-c. During step 602 the entries in input fields 212 are filled in, updated, or altered. In substep 602a a source of the packet is specified. For example, a source IP address may be specified in source address 310. In substep 602b, the entry point of the packet is specified in entry point 302 by specifying an IP address and an ingress interface or a first hop router, for example. In substep 602c, the destination of the packet is specified by entering a value in destination address 314. Although not listed, filling in entries for the other fields of input fields 212 may also be included in step 602. Any combination of input fields 212 may already contain the entry in which case the corresponding substep of setting that field may be skipped. In step 602, programmic interface 220 may be used to enter the packet parameters, security, and network information referred to above. Programmic interface 220 may automatically alter, update, and/or fill in any combination of fields of input fields 212 in addition to or instead of manually entering the information into input fields. Alternatively, programmic interface 220 may bypass input field 212.

In step 604, the ACL information and the topology information that is stored in ACL database 204 of network management system 200 is accessed. In decision box 606 a decision is made whether the ACL for the ingress interface of the current network device allows entry into the network device being entered. The first time that the loop of steps 604, 606, 610, 612, 614, 618, and 622 is processed, the current network device is the network device at which the packet enters the network (steps 606, 610, 612, 614, 618, and 622 will be discussed below in their numerical order among the steps of method 600). If no entry is permitted, then the method proceeds to step 608 where the current device is indicated as a maximum penetration point, the loop terminates for this device, and if this is the first network device, the termination of the loop is the determination of method 600. In step 608, if this is not the first network device, then a check is made whether there are any other network devices that need to be checked. If there are no other network devices that need to be checked, then step 608 terminates process 600. If there are any other network devices that need to be checked, as determined by step 608, then as part of terminating the loop for the current network device, method 600 proceeds to step 604 to check the next network device. Returning to decision box 606, if a determination is made that ingress into the current interface is allowed, then method 600 proceeds to step 610. However, if the current network device is the destination specified is step 602c, then the loop for the current network device may be terminated, and a loop may be started at step 604 for the next network device that needs to be checked (if there are any more network devices that need to be checked).

In step 610, the static routing tables 502 (if any are present) of the ACLs of the current network device are accessed.

In step 612, if static routing tables 502 are present, then a determination is made as to which interface outbound traffic is permitted to exit. If there are no static routing tables 502 that are present, then outbound traffic is allowed to exit through all interfaces. Consequently, the loop of steps 604, 606, 610, 612, 614, 618, and 622 is carried out for each interface of the current network device.

In decision box 614, a check is made as to whether any neighboring network devices exist. If there are no neighbors, then the method proceeds to step 616 where an indication of the current device is returned to the user as a maximum penetration point in output penetration information 214. At step 616, if there are no more network devices that need to be checked, then step 616 is the termination of method 600. If there are other network devices that need to be checked then the next network device is checked and method 600 returns to step 604. Returning to step 614, if there is one or more neighbors (i.e., if there is at least one interface that is connected to a neighboring network device), then method 600 proceeds to decision box 618 where a determination is made as to whether or not there are any outbound interfaces that have egress ACLs that permit the packet to reach the neighboring network device.

If in step 618 it is determined that there are no outbound interfaces having egress ACLs that permit a packet to egress, then method 600 proceeds to step 620 where the loop is ended for the current network device (however, other loops may still need to be performed or completed for other network devices), and the current network device is indicated as a maximum penetration point. At step 620, if there are no more network devices that need to be checked, then step 620 is the termination of method 600. If there are other network devices that need to be checked, then the next network device is checked and method 600 returns form step 620 to step 604. Returning to step 618, each outbound interface is checked and any neighboring network device to which egress the egress ACL or static routing table permits a packet to reach is added to the list of network devices that need to be checked, unless that neighboring device was already checked or was already on the list of network devices that need to be checked. In an embodiment, if there are any outbound interfaces for which egress is not permitted, the current network device is designated as a maximum penetration point, because it is a maximum penetration point is that direction. If in step 618 there are outbound interfaces t for which egress is permitted, then method 600 proceeds to step 622, and the current network device is set to the next network device on the list of network devices that need to be checked. If there are no other devices that need to be checked method 600 terminates. From step 622 the method proceeds back to step 604, where again the ACL and topology information is accessed. However, this time in step 604 the ACL and topology information is accessed with respect to the current network device to determine whether a packet may egress its interfaces and enter the neighboring devices that connect to those interfaces. By repeating the loop for each network device that was identified in step 618 as being in need of being checked (e.g., added to a list of network devices in need of being checked), the loop starting at step 604 is repeated for each neighboring network device.

In alternative embodiments, method 600 may not have all of the steps listed above, or may have other steps in addition to and/or instead of those listed above. Additionally, many of the steps in method 600 may be performed in a different order than listed above. Alternative embodiments of the algorithm described above can support analyzing dynamic ACLs, such as reflexive and Context Based Access Control list (CBAC) ACLs. In such scenarios, the algorithm could represent (e.g., simulate) the dynamic behavior. For example, for a given CBAC ACL the user could specify that traffic flows from IF address X to Y via a given router. This may cause changes to the ACL applied on various interfaces. In this approach, method 600 is then applied to using the changed ACL, and the amount of network penetration is measured. Method 600 is applied recursively for all variations of the ACLs that may be generated for each CBAC ACL.

In the above example given by method 600, a maximum penetration point is identified according to whether a virtual packet that enters a network device exits that network device. If the virtual packet enters but never exits a network device (whether it is because the network device has no outbound interfaces or because all outbound interfaces have already been traversed), that network device is designated as a maximum penetration point. However, there are a variety of other ways of defining and/or identifying maximum penetration points. For example, a network device that is a maximum number of hops from the most direct path between the entry port and destination port may be defined as a maximum penetration point. A maximum penetration point may be identified according to distance and/or time traveled. In an embodiment, after checking an interface of a first network device and determining that a packet can reach a neighboring network device that neighboring network device is checked before the next interface of the first network device is checked. In an embodiment, a network device having some of its outbound egresses blocked and others that are not blocked is not designated as a maximum penetration point. Any one of or any combination of the alternative definitions and/or methods of identifying maximum penetration points may used instead of or in addition to the maximum penetration points identified by method 600.

4.0 Implementation Mechanisms—Hardware Overview

Figure 7:
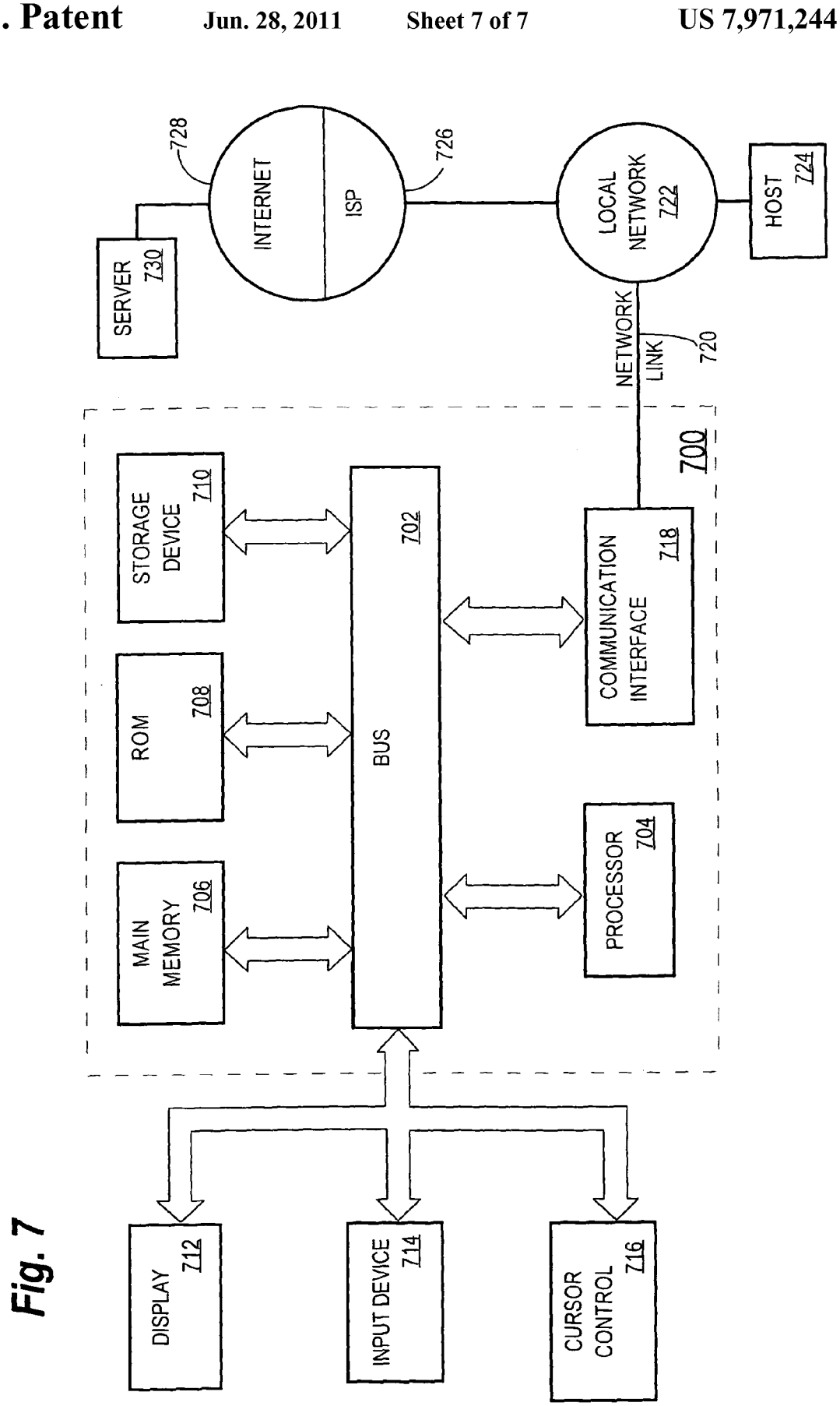
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for apart of or all of network management system 200. According to one embodiment of the invention, the methods of measuring network penetration, such as method 600, or any other method described in this specification may be implemented by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions (such as those of method 600) received by main memory 706 may optionally be stored on storage device 710 either before or after execution by processor 704. Method 600 may also be temporarily or permanently stored on any computer readable medium of computer system 700 or any other computer readable medium.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code (e.g., method 600 or any other method disclosed in this application), through the network(s), network link 720 and communication interface 718. In the Internet example, a server 730 might transmit a requested code for an application program through Internet 728, ISP 726, local network 722 and communication interface 718. In accordance with the invention, one such downloaded application provides for method 600 or any method of validating security described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining network penetration, the method comprising the computer-implemented steps of:
  receiving first information that identifies a packet;
  representing a possible travel of the packet in a network based on topology data and on security policy data;
  wherein the step of representing comprises:
    checking the first information against an inbound access control list (ACL), included in the security policy data, of an interface of a network device comprising a network entry point for the packet, wherein checking the first information against the inbound ACL includes determining whether the inbound ACL permits ingress of the packet at the network device;
    if the inbound ACL permits the ingress of the packet at the network device, checking the first information against one or more outbound ACLs for each outbound interface of the network device to determine one or more possible outbound interfaces on which egress of the packet is permitted from the network device;
    checking the topology data to determine one or more neighbor network devices that the packet could reach, wherein the one or more neighbor network devices are respectively connected to the one or more possible outbound interfaces on which the egress of the packet is permitted from the network device; repeating the checking steps for each neighbor network device, of the one or more neighbor network devices, that is connected to each of the one or more possible outbound interfaces;
  providing an output that specifies a possible penetration of the packet into the network, based on the step of representing, wherein the output comprises second information that specifies one or more of: possible paths that the packet could take in the network, and a set of network devices that the packet could reach in the network;
  wherein the steps of the method are performed by one or more computer systems.

2. The method of claim 1, wherein the security policy data comprises one or more access control lists of one or more network devices in the network.

3. The method of claim 1, wherein the first information comprises packet parameters.

4. The method of claim 3, wherein the packet parameters comprise an identifier of the network entry point where the packet enters the network.

5. The method of claim 3, wherein the packet parameters comprise a destination address.

6. The method of claim 1, wherein the topology data is received as input related to a user interface.

7. The method of claim 1, wherein the security policy data is based on access control lists associated with input received in a user interface.

8. The method of claim 1, wherein the step of representing further comprises determining a maximum penetration point.

9. The method of claim 1, wherein the step of representing comprises accessing the security policy data and the topology data related to a neighbor network device for which it has been determined that the packet could reach.

10. The method of claim 1, wherein the step of representing comprises determining whether ingress is allowed to a neighbor network device for which it has been determined that could be reached by the packet.

11. The method of claim 1, wherein the step of representing comprises determining whether there are any neighboring network devices to a neighbor network device for which it has been determined that the packet could reach.

12. The method of claim 1, wherein the step of representing comprises determining whether there are any outbound interfaces that have not yet been checked for whether there is another network device connected thereto.

13. The method of claim 12, wherein the step of representing comprises recursively applying the step of determining whether there are any outbound interfaces.

14. The method of claim 1, further comprising receiving third information that specifies packet parameters corresponding to a plurality of different packets.

15. The method of claim 1, wherein the step of representing comprises:
for a neighbor network device for which it is determined that the packet could reach, determining if a static routing table is present; and
if the static routing table is present, then
accessing the static routing table, and
determining an outbound interface through which egress of the packet from the neighbor network device is permitted based on the static routing table.

16. The method of claim 15, further comprising not considering any outbound interface through which egress of the packet is permitted by the static routing table but is not permitted by an access control list associated with the security policy data.

17. The method of claim 1, wherein the step of representing comprises:
for a neighbor network device for which it is determined that the packet could reach, determining if a static routing table is present; and
if the static routing table is not present, then for each outbound interface of the neighbor network device, representing an egress by the packet as part of the representing of the possible travel of the packet.

18. The method of claim 1, wherein the step of receiving the first information further comprises receiving packet parameters that support transmission control protocol flags.

19. The method of claim 1, wherein the output comprises a graphical display of at least the second information.

20. The method of claim 18, wherein the graphical display also includes at least a mapping of the set of network devices and connections between the network devices in the set of network devices.

21. A method of determining potential penetration of packets into a network, the method comprising the computer-implemented steps of:
receiving network topology data;
receiving first information defining a packet flow comprising a source address;
receiving second information defining a first network device, comprising a network address and an ingress interface identifier for an ingress interface of the first network device;
determining whether the ingress interface of the first network device allows the packet flow to enter the first network device, based on checking the first information against a first access control list associated with the ingress interface;
determining one or more egress interfaces of the first network device that allow egress of the packet flow from the first network device, based on checking the first information against one or more second access control lists associated with the one or more egress interfaces;
based on the network topology data, determining one or more second network devices that are coupled to the one or more egress interfaces; and
recursively performing the determining steps for each of the one or more second network devices;
wherein the steps of the method are performed by one or more computer systems.

22. The method of claim 21, further comprising the step of determining if a static routing table is present for the first network device, and wherein the step of determining the one or more egress interfaces further comprises checking the first information against the static routing table.

23. The method of claim 22, further comprising not considering an egress interface through which egress of the packet flow is permitted by the static routing table but is not permitted by the one or more second access control lists.

24. A method of determining network penetration, the method comprising the computer-implemented steps of:
representing a travel of a packet in a network based on topology data and on security policy data including at least the steps of:
receiving first information that defines a packet by at least specifying a source address for the packet and an entry point that identifies a current network device in the network;
starting a loop for the current network device;
accessing access control lists (ACLs) in the security policy data stored in an ACL database and the topology data stored in a topology database;
deciding whether an ingress interface of the current network device allows entry of the packet into the current network device by checking the first information against an inbound ACL, from the security policy data, that is associated with the ingress interface of the current network device, wherein:
if the entry is not permitted, then terminating the loop for the current network device;
if the entry is permitted, then
checking the first information against one or more outbound ACLs, from the security policy data, for each outbound interface of the current network device to determine one or more possible outbound interfaces on which egress of the packet is permitted from the current network device;
determining if a static routing table is present for the current network device, wherein:
if the static routing table is present then determining from which outbound interface outbound traffic is permitted to exit the current network device; and
if the static routing table is not present, then determining that the outbound traffic is allowed to exit through all outbound interfaces of the current network device;
based on the topology data, determining if there are any neighboring network devices that are connected to the one or more possible outbound interfaces on which the egress of the packet is permitted from the current network device, wherein:
if there are not any neighboring network devices, then returning an indication of the current network device as a maximum penetration point as at least part of results of the step of representing, and terminating the loop for the current network device;

determining whether or not there are any remaining possible outbound interfaces for which results of a possible egress of the packet have not been determined, wherein:
: if there are no more remaining possible outbound interfaces, then terminating the loop for the current network device;
: if there are more remaining possible outbound interfaces, then setting the current network device to a neighboring network device that corresponds to one of the remaining possible outbound interfaces; and
: if the loop has not been terminated, then restarting the loop for the current network device;

wherein the steps of the method are performed by one or more computer systems.

25. An apparatus for determining penetration into a network, the apparatus comprising:
: one or more processors;
: a topology database storing topology information about the network;
: an Access Control List (ACL) database storing ACLs related to the network;
: a non-transitory computer-readable storage medium storing one or more sequences of instructions that comprise instructions for displaying a penetration Graphical User Interface (GUI) including at least:
:: input fields having at least:
::: a source address input field for receiving at least a source address of a packet, and
::: an entry point field for receiving at least one entry point to the network for the packet;
:: output penetration information fields for a graphical output including:
::: network devices of the network,
::: connections between the network devices corresponding to the topology information,
::: at least one entry point to the network,
::: paths the packet is allowed to follow based on the topology information and the ACLs, and
::: at least one maximum penetration point; and
: a penetration module configured to:
:: access the topology database to retrieve the topology information;
:: access the ACL database to retrieve the ACLs;
:: receive input corresponding to the input fields;
:: check the source address of the packet, specified in the source address input field, against an inbound ACL of an interface of a network device specified in the entry point field;
:: if the inbound ACL permits ingress of the packet at the network device, check the source address of the packet against one or more outbound ACLs for each outbound interface of the network device to determine one or more possible outbound interfaces on which egress of the packet is permitted from the network device;
:: check the topology information to determine one or more neighbor network devices that the packet could reach, wherein the one or more neighbor network devices are respectively connected to the one or more possible outbound interfaces on which the egress of the packet is permitted from the network device;
:: repeat the checks for each neighbor network device, of the one or more neighbor network devices, that is connected to each of the one or more possible outbound interfaces on which the egress of the packet is permitted from the network device; and
:: produce the graphical output for display in the penetration GUI.

26. An apparatus for determining network penetration, the apparatus comprising:
: one or more processors, and a non-transitory computer-readable storage medium storing one or more sequences of instructions that comprise instructions which, when executed by the one or more processors, cause the one or more processors to perform the steps of:
: receiving first information that identifies a packet;
: representing a possible travel of the packet in a network based on topology data and on security policy data;
: wherein the step of representing comprises:
:: checking the first information against an inbound access control list (ACL), included in the security policy data, of an interface of a network device comprising a network entry point for the packet, wherein checking the first information against the inbound ACL includes determining whether the inbound ACL permits ingress of the packet at the network device;
:: if the inbound ACL permits the ingress of the packet at the network device, checking the first information against one or more outbound ACLs for each outbound interface of the network device to determine one or more possible outbound interfaces on which egress of the packet is permitted from the network device;
:: checking the topology data to determine one or more neighbor network devices that the packet could reach, wherein the one or more neighbor network devices are respectively connected to the one or more possible outbound interfaces on which the egress of the packet is permitted from the network device;
:: repeating the checking steps for each neighbor network device, of the one or more neighbor network devices, that is connected to each of the one or more possible outbound interfaces;
: providing an output that specifies a possible penetration of the packet into the network, based on the step of representing, wherein the output comprises second information that specifies one or more of: possible paths that the packet could take in the network, and a set of network devices that the packet could reach in the network.

27. The apparatus of claim 26, wherein the security policy data comprises one or more access control lists stored on one or more network devices in the network.

28. The apparatus of claim 26, wherein the first information comprises packet parameters.

29. The apparatus of claim 28, wherein the packet parameters comprise an identifier of the network entry point where the packet enters the network.

30. The apparatus of claim 28, wherein the packet parameters comprise a destination address.

31. The apparatus of claim 26, wherein the topology data is based on input related to a user interface.

32. The apparatus of claim 26, wherein the security policy data is based on access control lists associated with input related to a user interface.

33. The apparatus of claim 26, wherein the instructions that cause the one or more processors to perform the step of representing further comprise instructions which, when executed by the one or more processors, cause the one or more processors to perform the step of determining a maximum penetration point.

34. The apparatus of claim 26, wherein the instructions that cause the one or more processors to perform the step of representing comprise instructions which, when executed by the one or more processors, cause the one or more processors to perform the step of accessing the security policy data and the topology data related to a neighbor network device for which it has been determined that the packet could reach.

35. The apparatus of claim 26, wherein the instructions that cause the one or more processors to perform the step of representing comprise instructions which, when executed by the one or more processors, cause the one or more processors to perform the step of determining whether ingress is allowed to a neighbor network device for which it has been determined that the packet could reach.

36. The apparatus of claim 26, wherein the instructions that cause the one or more processors to perform the step of representing comprise instructions which, when executed by the one or more processors, cause the one or more processors to perform the step of determining whether there are any neighboring network devices to a neighbor network device for which it has been determined that the packet could reach.

37. The apparatus of claim 26, wherein the instructions that cause the one or more processors to perform the step of representing comprise instructions which, when executed by the one or more processors, cause the one or more processors to perform the step of determining whether there are any outbound interfaces that have not yet been checked for whether there is another network device connected thereto.

38. The apparatus of claim 37, wherein the instructions that cause the one or more processors to perform the step of representing comprise instructions which, when executed by the one or more processors, cause the one or more processors to perform the step of recursively applying the step of determining whether there are any outbound interfaces.

39. The apparatus of claim 26, wherein the one or more sequences of instructions further comprise instructions which, when executed by the one or more processors, cause the one or more processors to perform the step of receiving third information that specifies packet parameters corresponding to a plurality of different packets.

40. The apparatus of claim 26, wherein the instructions that cause the one or more processors to perform the step of representing comprise instructions which, when executed by the one or more processors, cause the one or more processors to perform the steps of:
for a neighbor network device being represented as having been reached by the packet, determining if a static routing table is present; and
if the static routing table is present, then
accessing the static routing table, and
determining an outbound interface through which egress of the packet from the neighbor network device is permitted based on the static routing table.

41. The apparatus of claim 40, wherein the one or more sequences of instructions further comprise instructions which, when executed by the one or more processors, cause the one or more processors to perform the step of not considering any outbound interface through which egress of the packet is permitted by the static routing table but is not permitted by an access control list associated with the security policy data.

42. The apparatus of claim 26, wherein the instructions that cause the one or more processors to perform the step of representing comprise instructions which, when executed by the one or more processors, cause the one or more processors to perform the steps of:
for a neighbor network device for which it is determined that the packet could reach, determining if a static routing table is present; and
if the static routing table is not present, then for each outbound interface of the neighbor network device, representing an egress by the packet as part of the representing of the possible travel of the packet.

43. The apparatus of claim 26, wherein the instructions that cause the one or more processors to perform the step of receiving the first information further comprise instructions which, when executed by the one or more processors, cause the one or more processors to perform the step of receiving packet parameters that support transmission control protocol flags.

44. The apparatus of claim 26, wherein the output comprises a graphical display of at least the second information.

45. The apparatus of claim 26, wherein the graphical display also includes at least a mapping of the set of network devices and connections between the network devices in the set of network devices.

46. A non-transitory computer-readable storage medium storing one or more sequences of instructions that comprise instructions which, when executed by the one or more processors, cause the one or more processors to perform the steps of:
receiving first information that identifies a packet;
representing a possible travel of the packet in a network based on topology data and on security policy data;
wherein the step of representing comprises:
checking the first information against an inbound access control list (ACL), included in the security policy data, of an interface of a network device comprising a network entry point for the packet, wherein checking the first information against the inbound ACL includes determining whether the inbound ACL permits ingress of the packet at the network device;
if the inbound ACL permits the ingress of the packet at the network device, checking the first information against one or more outbound ACLs for each outbound interface of the network device to determine one or more possible outbound interfaces on which egress of the packet is permitted from the network device;
checking the topology data to determine one or more neighbor network devices that the packet could reach, wherein the one or more neighbor network devices are respectively connected to the one or more possible outbound interfaces on which the egress of the packet is permitted from the network device;
repeating the checking steps for each neighbor network device, of the one or more neighbor network devices, that is connected to each of the one or more possible outbound interfaces;
providing an output that specifies a possible penetration of the packet into the network, based on the step of representing, wherein the output comprises second information that specifies one or more of: possible paths that the packet could take in the network, and a set of network devices that the packet could reach in the network.

47. The non-transitory computer-readable storage medium of claim 46, wherein the security policy data comprises one or more access control lists of one or more network devices in the network.

48. The non-transitory computer-readable storage medium of claim 46, wherein the first information comprises packet parameters.

49. The non-transitory computer-readable storage medium of claim 48, wherein the packet parameters comprise an identifier of the network entry point where the packet enters the network.

50. The non-transitory computer-readable storage medium of claim 48, wherein the packet parameters comprise a destination address.

51. The non-transitory computer-readable storage medium of claim 46, wherein the one or more sequences of instructions further comprise instructions which, when executed by the one or more processors, cause the one or more processors to perform the step of reading the topology data from a topology database.

52. The non-transitory computer-readable storage medium of claim 46, wherein the topology data is based on input related to a user interface.

53. The non-transitory computer-readable storage medium of claim 46, wherein the security policy data is based on access control lists associated with input related to a user interface.

54. The non-transitory computer-readable storage medium of claim 46, wherein the instructions that cause the one or more processors to perform the step of representing further comprise instructions which, when executed by the one or more processors, cause the one or more processors to perform the step of determining a maximum penetration point.

55. The non-transitory computer-readable storage medium of claim 46, wherein the instructions that cause the one or more processors to perform the step of representing comprise instructions which, when executed by the one or more processors, cause the one or more processors to perform the step of accessing the security policy data and the topology data related to a neighbor network device for which it has been determined that the packet could reach.

56. The non-transitory computer-readable storage medium of claim 46, wherein the instructions that cause the one or more processors to perform the step of representing comprise instructions which, when executed by the one or more processors, cause the one or more processors to perform the step of determining whether ingress is allowed to a neighbor network device for which it has been determined that the packet could reach.

57. The non-transitory computer-readable storage medium of claim 46, wherein the instructions that cause the one or more processors to perform the step of representing comprise instructions which, when executed by the one or more processors, cause the one or more processors to perform the step of determining whether there are any neighboring network devices to a neighbor network device for which it has been determined that the packet could reach.

58. The non-transitory computer-readable storage medium of claim 46, wherein the instructions that cause the one or more processors to perform the step of representing comprise instructions which, when executed by the one or more processors, cause the one or more processors to perform the step of determining whether there are any possible outbound interfaces that have not yet been checked for whether there is another network device connected thereto.

59. The non-transitory computer-readable storage medium of claim 58, wherein the instructions that cause the one or more processors to perform the step of representing comprise instructions which, when executed by the one or more processors, cause the one or more processors to perform the step of recursively applying the step of determining whether there are any outbound interfaces.

60. The non-transitory computer-readable storage medium of claim 46, wherein the one or more sequences of instructions further comprise instructions which, when executed by the one or more processors, cause the one or more processors to perform the step of receiving third information that specifies packet parameters corresponding to a plurality of different packets.

61. The non-transitory computer-readable storage medium of claim 46, wherein the instructions that cause the one or more processors to perform the step of representing comprise instructions which, when executed by the one or more processors, cause the one or more processors to perform the steps of:
  for a neighbor network device that could be reached by the packet, determining if a static routing table is present; and
  if the static routing table is present, then
    accessing the static routing table, and
    determining an outbound interface through which egress of the packet from the neighbor network device is permitted based on the static routing table.

62. The non-transitory computer-readable storage medium of claim 61, wherein the one or more sequences of instructions further comprise instructions which, when executed by the one or more processors, cause the one or more processors to perform the step of not considering any outbound interface through which egress of the packet is permitted by the static routing table but is not permitted by an access control list associated with the security policy data.

63. The non-transitory computer-readable storage medium of claim 46, wherein the instructions that cause the one or more processors to perform the step of representing comprise instructions which, when executed by the one or more processors, cause the one or more processors to perform the steps of:
  for a neighbor network device that could be reached by the packet, determining if a static routing table is present; and
  if the static routing table is not present, then for each outbound interface of the neighbor network device, representing an egress by the packet as part of the representing of the possible travel of the packet.

64. The non-transitory computer-readable storage medium of claim 46, wherein the instructions that cause the one or more processors to perform the step of receiving the first information further comprise instructions which, when executed by the one or more processors, cause the one or more processors to perform the step of receiving packet parameters that support transmission control protocol flags.

65. The non-transitory computer-readable storage medium of claim 46, wherein the output comprises a graphical display of at least the second information.

66. The non-transitory computer-readable storage medium of claim 46, wherein the graphical display also includes at least a mapping of the set of network devices and connections between the network devices in the set of network devices.

67. An apparatus for determining network penetration comprising:
  means for receiving first information that identifies a packet;
  means for representing a possible travel of the packet in a network based on topology data and on security policy data;

wherein the means for representing comprise:
- means for checking the first information against an inbound access control list (ACL), included in the security policy data, of an interface of a network device comprising a network entry point for the packet, wherein the means for checking the first information against the inbound ACL include means for determining whether the inbound ACL permits ingress of the packet at the network device;
- means for checking the first information against one or more outbound ACLs for each outbound interface of the network device to determine one or more possible outbound interfaces on which egress of the packet is permitted from the network device when the inbound ACL permits the ingress of the packet at the network device;
- means for checking the topology data to determine one or more neighbor network devices that the packet could reach, wherein the one or more neighbor network devices are respectively connected to the one or more possible outbound interfaces on which the egress of the packet is permitted from the network device;
- means for repeatedly invoking the means for checking the first information against the inbound ACL, the means for checking the first information against the one or more outbound ACLs, and the means for checking the topology data for each neighbor network device, of the one or more neighbor network devices, that is connected to each of the one or more possible outbound interfaces on which the egress of the packet is permitted from the network device;

means for providing penetration output that specifies a possible penetration of the packet into the network, based on output from the means for representing, wherein the penetration output comprises second information that specifies one or more of: possible paths that the packet could take in the network, and a set of network devices that the packet could reach in the network.

* * * * *